United States Patent [19]
Takikawa

[11] Patent Number: 5,354,107
[45] Date of Patent: Oct. 11, 1994

[54] FLARED DOUBLE-WALL STRUCTURE FOR CONNECTING METAL PIPES

[75] Inventor: Kazunori Takikawa, Numazu, Japan

[73] Assignee: Usui Kokusai Sangyo Kaisha Ltd., Japan

[21] Appl. No.: 164,394

[22] Filed: Dec. 9, 1993

Related U.S. Application Data

[63] Continuation-in-part of Ser. No. 952,577, Sep. 28, 1992, abandoned.

[30] Foreign Application Priority Data

Oct. 2, 1991 [JP] Japan .............................. 3-088515[U]

[51] Int. Cl.⁵ .................................................. F16L 19/02
[52] U.S. Cl. .................................. 285/334.5; 285/328; 285/917
[58] Field of Search .................... 285/334.5, 234, 328, 285/917; 72/317

[56] References Cited

U.S. PATENT DOCUMENTS

| | | | |
|---|---|---|---|
| 533,150 | 1/1895 | Trethtewey et al. | 285/246 |
| 771,682 | 10/1904 | Sussman | 285/334.5 |
| 1,058,542 | 4/1913 | Brown | 285/334.5 |
| 2,242,831 | 5/1941 | McIntosh | 72/317 |
| 2,267,416 | 12/1941 | Neukirch | 285/334.5 |
| 2,289,382 | 7/1942 | Parker | 285/334.5 |
| 3,214,198 | 10/1965 | Peuchmavr | 285/334.5 |
| 3,265,413 | 8/1966 | Currie | 285/334.5 |
| 4,598,937 | 7/1986 | Sugao | 285/334.5 |
| 4,893,657 | 1/1990 | Usui | 285/334.5 |
| 5,002,316 | 3/1991 | Chohan | 285/917 |
| 5,271,647 | 12/1993 | Usui | 285/917 |

FOREIGN PATENT DOCUMENTS

| | | | |
|---|---|---|---|
| 1141975 | 9/1957 | France | 285/334.5 |
| 1196320 | 11/1959 | France | 285/334.5 |
| 2140115 | 11/1984 | United Kingdom | 285/328 |

*Primary Examiner*—Eric K. Nicholson
*Attorney, Agent, or Firm*—Anthony J. Casella; Gerald E. Hespos

[57] ABSTRACT

Herein disclosed is a flared double-wall structure which forms one open end of a metal pipe to be connected to one end of a mating joint. The flared double-wall structure has one annular brim formed on and along the inner sheet face of the double walls and in the open end.

5 Claims, 2 Drawing Sheets

FLARED DOUBLE-WALL STRUCTURE FOR CONNECTING METAL PIPES

This application is a continuation-in-part of application Ser. No. 07/952,577, filed Sep. 28, 1992, now abandoned.

BACKGROUND OF THE INVENTION

1. Field of the Invention

The present invention relates to a structure for connecting a metal pipe and, more particularly, to an improvement in a flared double-wall structure which is formed at one open end of a metal pipe to be connected to one end of a mating joint. The metal pipe has a relatively small diameter and thickness, e.g., a diameter of 20 mm and a thickness of 1.5 mm or less and is generally arranged for oil or air feed passages in an automobile or a variety of machines or apparatus.

2. Description of the Prior Art

A flared double-wall structure of this kind for the connection according to the prior art is shown in FIG. 4. In this structure, one open end 11' of a pipe P' to be connected is so flared at 11 that it is formed of a conical wall 12 opened outward merely smoothly. For the connection, the flared double-wall structure is fastened and firmly clamped between the pressure receiving seat of a mating joint 13 and the pressure seat of a nut 14.

In this prior art, however, the double-wall flare 11 has its seat made to abut in a facial contact all over its face against the pressure receiving seat of the partner by the flatness of the conical wall 12, so that its facial pressure is reluctant to rise and feasible to cause a leakage. Moreover, an excessive fastening is invited to prevent the leakage at the mating pressure receiving seat due to a dispersion in the bent shape of the pipe P'. On the other hand, concentrations of fatigue and stress are caused at the neck of the double-wall flare 11 due to the structural limitation such as the small thickness of the pipe P' itself and the state of arrangement under vibrations. Thus, the structure of the prior art is frequently troubled by a cracking or breakage.

SUMMARY OF THE INVENTION

The present invention has been conceived in view of the above-specified problems intrinsic to the prior art and has an object to provide a flared double-wall structure for an open end of a metal pipe: to raise a facial pressure locally for the connection thereby to eliminate any excessive fastening force; and to disperse the concentration of stress at the neck of the double-wall flare and lighten the fatigue thereby to eliminate either cracking or breakage at the neck for a long time.

In order to achieve the above-specified object, according to the present invention, there is provided a flared double-wall structure formed at one open end of a metal pipe to be connected to one end of a mating joint, which structure comprises one annular brim formed on and along an inner sheet face of the double wall and in said open end. The annular brim has a conical or arcuate section.

Thanks to this construction, i.e., the structure of the annular brim in the open end according to the present invention, the facial pressure is locally raised by the elastic force which is established by a linear connection as the pressure receiving face of the joint is clamped by the nut. Even if, therefore, a local pressure is built up at the pressure receiving face, no excessive fastening force is required. At the same time, the concentration of stress can be lightened and effectively dispersed at the neck of the double-wall flare. Thus, the fear of cracking and breakage of the neck can be eliminated even if the structure is arranged under vibrations, so that the connection can be maintained stably and reliably for a long time.

DETAILED DESCRIPTION OF THE PREFERRED EMBODIMENTS

Figure 1:
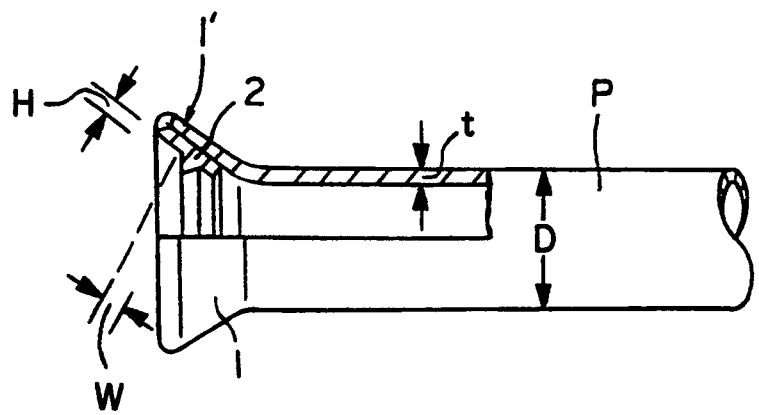
FIG. 1 is a partially cut-away top plan view showing a flared double-wall structure in an open end of a pipe.
Figure 2:
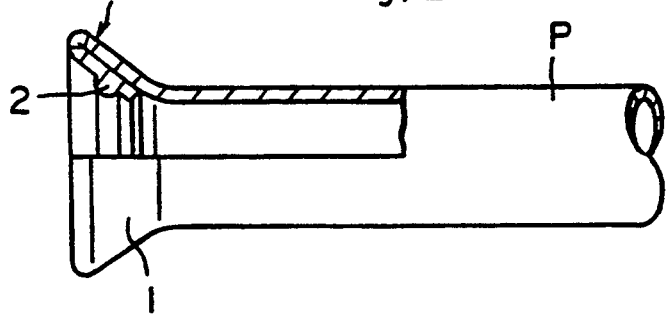
FIG. 2 is similar to FIG. 1 but shows another embodiment.
Figure 3:
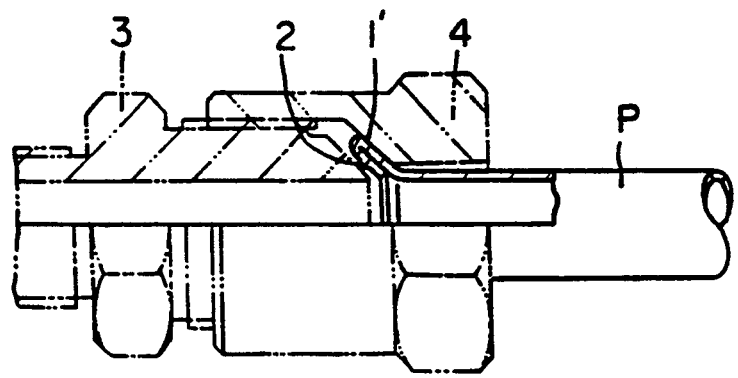
FIG. 3 is a partially cut-away longitudinal section showing the connected state of FIG. 1.
Figure 4:
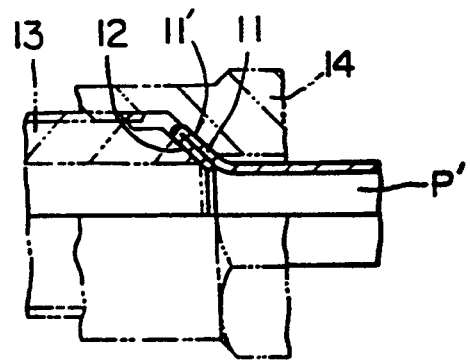
FIG. 4 is a partially cut-away longitudinal section showing the connected state of the connecting flared double-wall structure of the prior art.

In FIGS. 1 to 3, reference numeral 1 designates a double-wall flare formed at one end of a metal pipe P. This pipe P is flared at 1 to its open end 1' and is formed an annular brim 2 on and along the inner sheet surface in the open end 1'. This annular brim 2 is exemplified to have a triangular section (as shown in FIG. 1) or an arcuate section (as shown in FIG. 2). For the connection, the annular brim 2 is elastically clamped to raise a facial pressure locally, as it is fastened, between the pressure receiving face of a mating joint 3 and the pressure face of a nut 4.

As noted above, the pipe P has a relatively small diameter "D" of approximately 20 mm and a relatively small wall thickness "t" of about 125 mm or less, as measured in a radially direction. The annular brim 2 preferably has a height "H" in the range of 0.3 t to 1.0 t. Additionally, the brim 2 preferably has a width in the range of 1.0 t–3.0 t. As shown in FIGS. 1 and 2, the height "H" is measured substantially perpendicular to the surface of the pipe P, and the width "W" is measured substantially parallel to the surface of the pipe P. Although a small height or width would intuitively be deemed sufficient, it has been determined that a brim 2 with a height "H" less than 0.3 t and/or a width "W" less than 1.0 t is likely to be substantially collapsed during connection with another fitting so that the facial pressure will not be increased. Hence, leakage of fluid at a joint formed with the pipe may develop over time. On the other hand, a height "H" greater than 1.0 t and/or a width "W" greater than 3.0 t will be extremely difficult to form by molding processees, and hence must be formed by machining and/or cutting. Such processees are costly and unsuitable for mass production. Additionally, a brim with a very great height "H" could be subjected to internal bending moments, and failure of such a very high brim could result.

According to the flared double-wall structure of the present invention, as has been described herein before, the double-wall flare 1 of the pipe is formed with the annular brim 2 on the inner face of the open end 1'. As a result, the facial pressure of the seat is raised by the linear contact with the seat as the open end is fastened for the connection. Even if, therefore, a local pressure is built up at the pressure receiving face, no excessive fastening force is required for the nut 4. At the same time, the concentration of stress can be lightened and effectively dispersed at the neck of the double-wall flare 1. Thus, the fear of cracking the breakage of the neck can be eliminated even if the structure is arranged under vibrations, so that the connection can be maintained stably and reliably for a long time. Thus, the present invention can provide a remarkably useful flared double-wall structure for connecting the open end of the pipe.

What is claimed is:

1. A metal pipe having a substantially cylindrical fluid carrying portion with a substantial uniform wall thickness consisting of a single layer of metal having a thickness t, said pipe further comprising a connecting end, said connecting end including an outwardly flared outer pipe wall extending from said cylindrical fluid carrying portion of said pipe to an outer end of said pipe and an inner pipe wall extending from said outer end inwardly toward said cylindrical fluid carrying portion, said inner and outer pipe walls of said connecting end being disposed in abutting face-to-face relationship with one another, said inner pipe wall having an inwardly facing surface including an inner conical surface substantially adjacent the cylindrical fluid carrying portion and an outer conical surface adjacent the outer end, the inner and outer conical surfaces having the same axis and angle of generation, and an inwardly projecting annular brim therebetween, said annular brim defining a height measured perpendicular to adjacent portions of said inner pipe wall of between approximately 0.3 t and 1.0 t, and a width measured parallel to adjacent portions of said inner pipe wall of between 1.0 t and 3.0 t, said annular brim being engageable by a generally conical surface of a mating pipe connector for effectively concentrating mating forces at the brim and isolating mating forces from regions of said cylindrical fluid carrying portion adjacent said outer pipe wall of said connecting end.

2. A metal pipe according to claim 1, wherein said annular brim has a conical section.

3. A metal pipe according to claim 1, wherein said annular brim has an arcuate section.

4. A metal pipe according to claim 1, wherein the wall thickness t of said pipe is no greater than approximately 1.5 mm.

5. A metal pipe according to claim 4, wherein said pipe defines a diameter of approximately 20 mm.

* * * * *